No. 11,797. Reissued Dec. 26, 1899.
W. F. STIMPSON.
COMPUTING SCALE.
(Application filed Oct. 8, 1896.)
Fig. 1
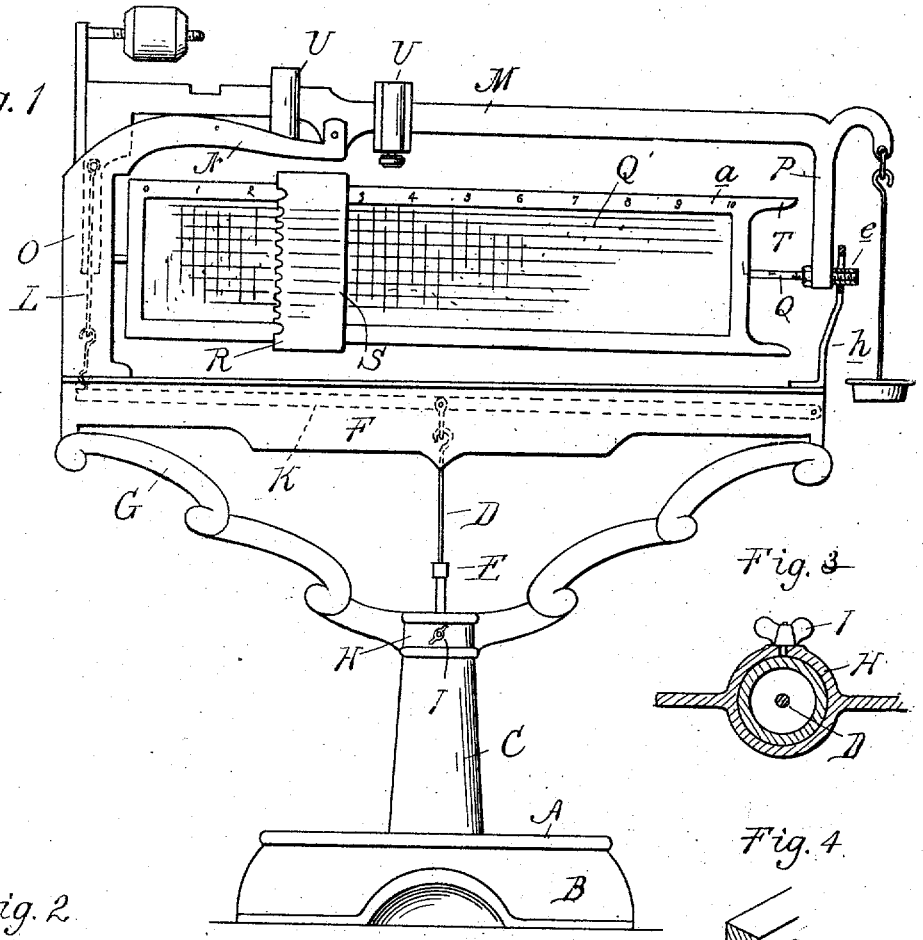
Fig. 3
Fig. 4
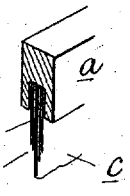
Fig. 5
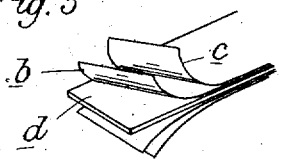
Fig. 2
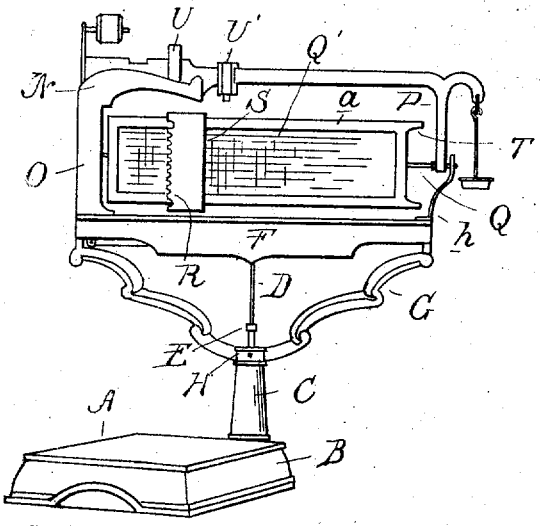
Witnesses:
P. M. Hulbert
Otto H. Bullard
Inventor:
Walter F. Stimpson
By Chas. A. Sprague & Son
Attys.

UNITED STATES PATENT OFFICE.

WALTER F. STIMPSON, OF MILAN, MICHIGAN.

COMPUTING-SCALE.

SPECIFICATION forming part of Reissued Letters Patent No. 11,797, dated December 26, 1899.

Original No. 543,323, dated July 23, 1895. Application for reissue filed October 8, 1896. Serial No. 608,311.

*To all whom it may concern:*

Be it known that I, WALTER F. STIMPSON, a citizen of the United States, residing at Milan, in the county of Monroe and State of Michigan, have invented certain new and useful Improvements in Computing-Scales, of which the following is a specification, reference being had to the accompanying drawings.

The invention relates to an improvement in computing-scales; and it consists in the construction and arrangement of the parts hereinafter described, and definitely pointed out in the claims.

In the drawings, Figure 1 is a front elevation of a scale embodying my invention. Fig. 2 is a perspective view of the scale, showing the beam turned at a different angle to the platform than that shown in Fig. 1. Fig. 3 is a cross-section through the top of the pillar. Fig. 4 is a sectional perspective of a portion of the beam, and Fig. 5 is a perspective showing the manner of manufacturing the computing-table portion of the beam.

A is the platform, resting on the usual levers, (not shown,) and which are suspended in the frame B. At one end of the frame is the pillar C, under which the ends of the levers project and from which projects the connecting-rod D, having a swivel-joint E, of any desired or well-known form, at some point in its length.

F is a shelf having the downwardly-extending supporting-arms G, which at their meeting-point are provided with a collar H, pivotally supported on a reduced portion at the top of the pillar C. I is a set-screw in the collar, by means of which the collar and the shelf may be secured at any desired position in relation to the platform—as, for instance, as shown in Figs. 1 and 2. This shelf F is provided with depending side flanges, and on its under side is suspended the shelf-lever K, to which the connecting-rod D centrally connects. The opposite end of the lever is suspended on the lower end of the beam-rod L, which at its upper end connects to the rear end of the beam M. This beam M is the tare-beam of the scale and is fulcrumed at a point substantially midway its center and end on a bearing in the end of the horizontal arm N, which extends out from the top of the standard O, supported on top of the shelf at one end and bifurcated to permit the beam to play between the bifurcations.

The beam M has the depending bars P at each end, and from the lower ends thereof are the inwardly-extending pins Q, on which is pivoted the frame of the computing-panel Q′, which extends, as shown, on both sides of the fulcrum of the tare-beam, whereby a panel and computing-table of increased length may be used, the same being substantially or nearly double the length of the indicating portion of the tare-beam. This computing-panel comprises a rectangular frame *a*, having grooved bars, as shown in Fig. 4, the bars of the frame being detachably secured together.

The computing-table is printed on sheets of paper *b*, which are then coated with a layer of transparent celluloid *c*, and the computing-tables are then mounted upon the opposite sides of a cardboard backing or panel *d*; the ends of the panel entering the grooves in the frame and the frame being then secured together, as shown, and pivoted on the pins on the tare-beam. The outer pin extends through the arm P, and the projecting end is covered with a rubber sleeve *e*, which works in an eye formed in the upper end of the standard *h* on the shelf and forms the stop for the beam.

R is the poise on the panel, which has a lateral extension S, on which are the price-per-pound computations giving the value of the counterpoise-weights, and the computing-panel at its end is provided with the extension T, on which the poise runs so as to bring its reading edge to the last row of figures on the panel carrying the figures.

U is the usual scoop-balance, and U′ the usual poise on the tare-beam.

The operation of the device is too well known to require description.

The construction of panel described produces one which is light, strong, and in which the figures are legible, can readily be cleaned, and can be produced at a comparatively small cost.

By pivoting the shelf carrying the beam to the pillar the beam may be turned at such an angle as to give a good light for the person using it, and this is desirable, as most stores are lighted only from the front, while the scales are usually turned with the beam pointed toward the light.

The construction of the tare-beam and computing-panel I also deem especially desirable, simple, and efficient.

An important advantage in having the depending arms at the ends of the tare-beam and mounting the panel thereon is that the number of computations recorded or noted on the weighing-panel is very great, and it is therefore necessary to obtain as much space as possible to put them on and also to avoid crowding. This is accomplished, and at the same time the indicating portion of the tare-beam is of ample length.

What I claim as my invention is—

1. In a computing-scale, the combination with the platform and base, of a pillar on the base, the supporting-arms G, a sleeve connecting the lower ends of the arms and loosely fitted on the pillar, means for securing the sleeve in position the shelf F supported on the arms, the shelf-lever K, the rod D having a swivel-section, and connected with the lever K and the platform, the tare-beam M supported on the shelf, and the pivotally-supported computing-panel Q′ carried by the tare-beam, substantially as described.

2. In a computing-scale, the combination with the platform, of the supporting-arm O at one end thereof having the forwardly-extending arm N at a point substantially midway between the center and end, the tare-beam pivotally supported on the arm N and having depending projections at opposite ends, the computing-panel pivotally secured at the center of its ends to the projections on the beam, means for limiting the movement of the beam, and the poise R on the panel, substantially as described.

3. In a computing-scale, the combination with the tare-beam, of a computing-panel, pivotal connections between the beam and panel comprising pins loosely engaging projections on the beam, and a fixed slotted standard through which one of the pins passes, substantially as described.

4. The combination with a tare-beam pivotally supported intermediate its ends and having vertical end extensions, a weighing and computing panel extending on both sides of the fulcrum-pivot of the tare-beam and pivoted in the extensions, and a weighing and price poise on said panel, substantially as described.

5. In a price-scale, the weighing-panel consisting of an open frame pivoted centrally at the ends and having the weight-indications on both sides of both edges, a panel having marked thereon computations on both sides, detachably secured in the frame, and a double poise sliding on the frame and having on both faces a progressive series of price-per-pound marks, substantially as described.

6. The combination of a pivoted beam, extensions at the ends of the beam on opposite sides of the fulcrum-pivot thereof and a member having a progressive series of computations of value on both sides and weight-indications, said member extending on both sides of the fulcrum-pivot of the beam and pivoted in the extensions, and a weighing-poise on said member extending across the computations adapted to register with the said weight-indications and having prices per pound corresponding to the computations, substantially as described.

7. In a price-scale, the combination of a beam, extensions at the ends of said beam, the fulcrum of the beam being between the extensions, a flat panel or chart pivoted substantially midway of its end edges in the said extensions, having computations of value and weight-indications upon both sides, and a weighing-poise on said panel, having prices per pound upon both sides, complementary to the computations upon the panel.

8. The combination of a pivoted beam, extensions at the ends of the beam on opposite sides of the fulcrum-pivot thereof, and a member having a progressive series of computations of value on both sides and weight-indications, said member extending on both sides of the fulcrum-pivot of the beam and pivoted in the extensions, a weighing-poise on said member extending across the computations adapted to register with the said weight-indications and having prices per pound corresponding to the computations, and a tare-poise on the pivoted beam, substantially as described.

In witness whereof I affix my signature in presence of two witnesses.

WALTER F. STIMPSON.

Witnesses:

OTTO F. BARTHEL,

M. B. O'DOGHERTY.